United States Patent [19]

Kowalczyk

[11] Patent Number: 5,192,346
[45] Date of Patent: Mar. 9, 1993

[54] AIR PURIFIER PLEATED FILTER TO STOP POLLUTION FOR PASSENGER INSIDE OF THE MOTOR VEHICLE

[76] Inventor: Thaddeus Kowalczyk, 8163 Lochdale, Dearborn Heights, Mich. 48127

[21] Appl. No.: 917,855

[22] Filed: Jul. 22, 1992

[51] Int. Cl.$^5$ ............................................. B01D 53/04
[52] U.S. Cl. ..................................... 55/269; 55/316; 55/521
[58] Field of Search ................. 55/316, 497, 521, 269

[56] References Cited

U.S. PATENT DOCUMENTS

| | | | |
|---|---|---|---|
| 4,236,901 | 12/1980 | Kato et al. | 55/497 X |
| 4,259,096 | 3/1981 | Nakamura et al. | 55/316 |
| 4,289,513 | 9/1981 | Brownhill et al. | 55/316 X |
| 4,714,486 | 12/1987 | Silverthorn | 55/316 |
| 4,828,590 | 5/1989 | Eckstein et al. | 55/516 |
| 4,865,637 | 9/1989 | Gruber | 55/316 X |
| 4,909,815 | 3/1990 | Meyer | 55/316 |
| 5,004,487 | 4/1991 | Kowalczyk | 55/269 |

*Primary Examiner*—Charles Hart

[57] ABSTRACT

This invention is an air purifier pleated flat filter to be installed in passenger motor vehicles to stop pollution for passengers inside of the motor vehicle. This filter will cleanse the air which is pulled by the blower from outside the motor vehicle and/or the existing air polluted by passengers inside the motor vehicle. It also absorbs the odors and emissions from the air conditioner. This filter prevents pollutants, which are emitted from the exhaust fumes of the motor vehicles, as well as hydrocarbons, odors, smoke, soot, dust and allergens-pollen from polluting the air which enters the motor vehicle interior. The pleated filter is preferably installed in the plenum of the vent which is connected to the cowl plenum chamber or in the plenum of cowl plenum chamber of the vehicles's heating-cooling system. The filter is also preferably equipped with a sensor switch that notifies the driver whenever the filter becomes dirty and must be replaced. The filter includes a hot fluid heater, such as a hot water heater, which protects the filter from freezing and keeps the filter dry which stops bacteria from multiplying and prevents odors. This purified fresh air is important to people with emphysema, asthma and all kinds of allergies. By installing the pleated filter in motor vehicles, we can be assured of breathing purer air.

5 Claims, 3 Drawing Sheets

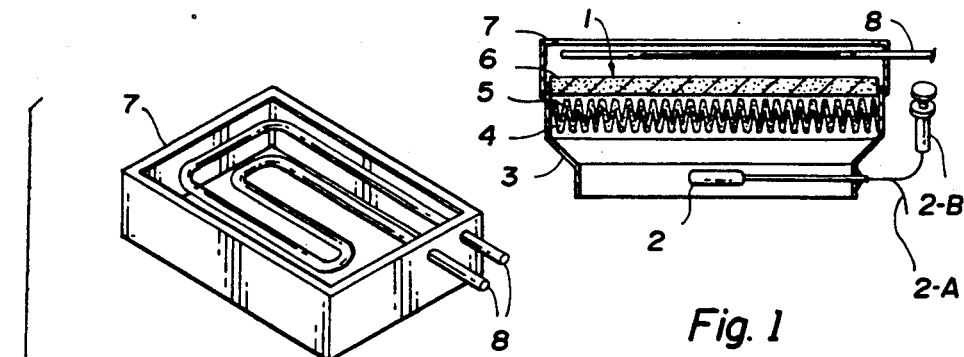
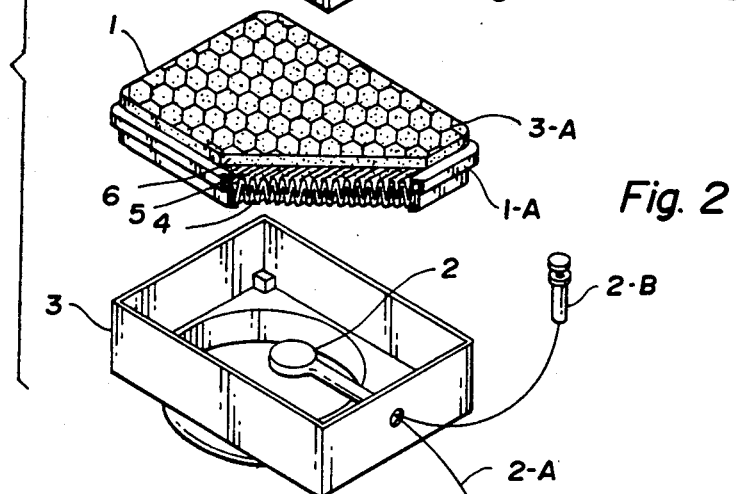
Fig. 1
Fig. 2
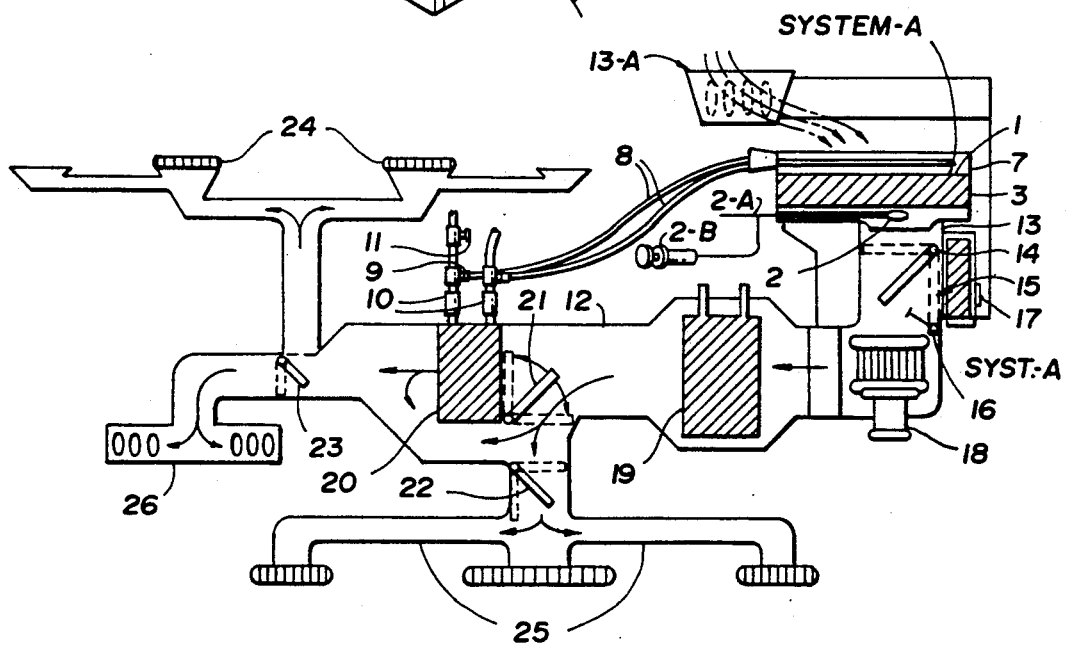
Fig. 3

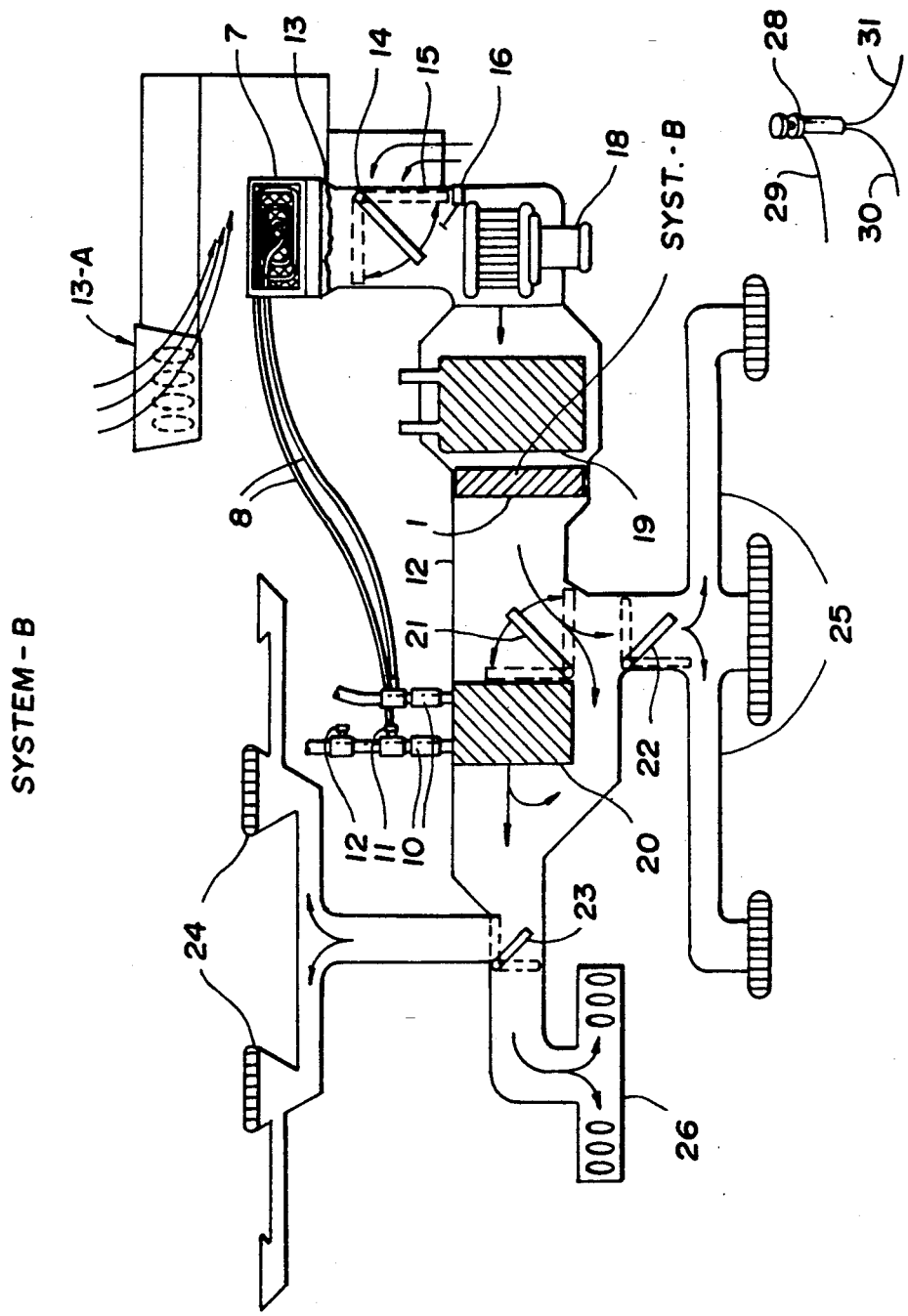
Fig. 3-A

AIR PURIFIER PLEATED FILTER TO STOP POLLUTION FOR PASSENGER INSIDE OF THE MOTOR VEHICLE

CROSS REFERENCE TO RELATED APPLICATION OF PATENTS

This is an application for a patent and is related to my earlier U.S. Pat. No. 4,610,703, issued Sep. 9, 1986 and U.S. Pat. No. 4,702,753, issued Oct. 27, 1987, and U.S. Pat. No. 5,004,487, issued Apr. 2, 1991.

TECHNICAL FIELD

This invention is a pleated flat filter for cleaning the air which enters the motor vehicle's interior and/or the ambient interior air within a motor vehicle. A pleated flat filter provides a large surface area for more air flow of CFM.

BACKGROUND ART

The whole world is becoming one great highway owing to the greater availability of motor vehicles to people the world over. The only air that the driver and passengers can breathe is the air in the motor vehicle which enters the interior through inlets in the heating-cooling system. That air is polluted by the exhaust fumes emitted from the motors of passing motor vehicles, and allergens-pollen.

Many years have passed since the invention of the motor vehicle. Today, there are millions of them and increasingly more of those that make use of fuel, diesel fuel and alcohol. Built in various sizes, they burn various fuel and emit exhaust fumes that pollute the air, particularly certain older motor vehicles with improperly work engines which pollute the air more. These motor vehicles are used for various purpose: to transport people in buses, for instance. Certain jobs require that we spend many hours in motor vehicles. Almoust every person uses a motor vehicle for various reasons. In all of this we inhale polluted air. To this day, all that has been done to protect people from exhaust fumes is to have installed an exhaust system catalytic convertor and return a portion of the exhaust fumes for a secondary burning.

One of the greatest needs in our motor vehicles today is to install a pleated filter to clean the air pulled into and the existing air inside the motor vehicle of pollutants. Such as pleated filter could be installed in the plenum of the fresh air inlet which is connected to the cowl plenum chamber of the heating-cooling system. During production in new automobiles, a fresh air inlet has to be an appropriate amount of square inches area for the filter to allow sufficient air into the interior of the motor vehicle. Also the blower must be appropriate by constructed to produce enough force to pull or push a sufficient amount of air through the filter. In the fresh air inlet is installed a pleated filter, and also in the circulating inlet to clean the air pulled into and the existing air inside the motor vehicle of pollutants, or only one pleated filter would be installed in the cowl plenum chamber between evaporator and heater core, so that it would be in line with air entering the vehicle and being pulled into the vehicle interior by the blower through the outside vent. This filter will cleanse the air which is pulled by the blower from outside the motor vehicle and/or the existing air polluted by passengers inside the motor vehicle. Such an pleated flat filter could be composed of a one or more of appropriate components that depollute the air, and is pleated in such a way as to increase the surface area of the filter which allows more air flow of CFM.

DISCLOSURE OF THE INVENTION

An objective of the present invention as applied to motor vehicles is to provide a pleated flat filter which protects health, and in certain cases prevents outright poisoning.

In carrying out the above objective and other objectives of the present invention, a pleated flat filter is used in an air heating-cooling system for the passenger compartment of a motor vehicle. The system includes a plenum and the pleated flat filter is positioned in the plenum. Also the pleated flat filter includes a housing unit containing a replaceable filter element. The element has multiple layer which provide an increased surface area for contact with air passing through the air passes thru from an upstream position to a downstream position adjacent to the filter element. The heater is comprised of a hot liquid heater and means are provided for supplying hot liquid from the source of hot liquid to the hot liquid heater.

The pleated flat filter is a an improvement over my devices disclosed in U.S. Pat. No. 4,610,703 issued Sep. 9, 1986, and U.S. Pat. No. 4,702,753, issued Oct. 27, 1987, and U.S. Pat. No. 5,004,487 issued Apr. 2, 1991. These improvements consist of: (1) a pleated one or more media together for flat filter which providing for increase surface area of the filter. This filter allows more air flow of the CFM. (2) Production in new automobiles can be installed of the pleated flat filter in the cowl plenum chamber between the evaporator and heater core which will clean the air from outside of the motor vehicle and/or existing air polluted by passengers inside the motor vehicle, it also absorbs the odor and emissions from air conditioner. (3) The improved system can also eliminate fog on the inside of windows in motor vehicles when the weather is at 90% humidity and the temperature is 32° F. and up. By using both the heater and the air conditioner simultaneously, the evaporator takes the humidity out, which clears the windows from fog, and the heater keeps the passengers warm. All that is needed to one more button on the instrument panel, a fog button, which is connected to the heater and air conditioner.

This new pleated flat filter can be installed in the fresh air inlet and also may be installed in the circulation inlet which cleans the polluted air coming from the outside and/or the existing air polluted by passengers inside the automobile. Only one pleated filter can be installed in the plenum, it will clean the polluted air coming from the outside and/or the existing air polluted by passengers inside the automobile. The blower must be appropriately constructed to produce enough force to pull or push a sufficient amount of air through the filter. The pleated filter element housed in the container or housing of the assembly unit preferably includes quality artificial water-resistant fibers and activated charcoal carbon. This filter will remove pollutants emitted from the exhaust fumes of the motor vehicle, as well as hydrocarbons, odors, soot, smoke, dust, and allergens-pollen from the air which enters the motor vehicle interior. A hot water heater is preferably mounted to protect the filter element from freezing and keeps it dry. Also, a sensor switch mounted in the assembly notifies the driver whenever the filter becomes dirty.

The moment this invention finds use in motor vehicles, it will help prevent poisoning in certain cases and will certainly insure better health for motor vehicle drivers and passengers. It will be especially helpful for people suffering from emphysema, asthma, and all kinds of allergies. The pleated filter of the present invention can be constructed so as to include flat, rectangular, circular or square which will increase the surface area. This eliminates a substantial amount of air pollution entering the motor vehicle interior for long periods of use before becoming clogged with dirt. The pleated flat filter unit is a small and simple constructed apparatus which is easily installed in all existing and new automobiles and containes a replaceable inside filter element. The container of this apparatus consists of one or two closed parts in which there is housed the replaceable filter. In one part of the container on the inlet side is mounted the hot water heater. A sensor switch is mounted in the other part of the container on the outlet side to inform the operator when the filter needs to be changed. The large cabin of a motor vehicle require more force to suck in or blow in the appropriate amount of air. An additional vent is appropriately constructed from the exterior of the motor vehicle and is connected to the cowl plenum chamber of the heating-cooling system in which the filter is installed. When the motor vehicle is in motion, this vent will allow the air to enter by dint of air resistance, so that the air will flow easily through the filter and it will be easier for the blower inside it to suck and push the air into the interior of the motor vehicle.

BRIEF DESCRIPTION OF THE DRAWING

FIG. 1 is a cross-section view showing a first embodiment of a pleated flat filter of the present invention;

FIG. 2 is an exploded perspective view of the pleated flat filter apparatus;

FIGS. 3 and 3-A are a diagrammatic views of different embodiments of the pleated flat filter in a conventional heating-cooling system of a motor vehicle;

BEST MODE FOR CARRYING OUT THE INVENTION

Figure 4:
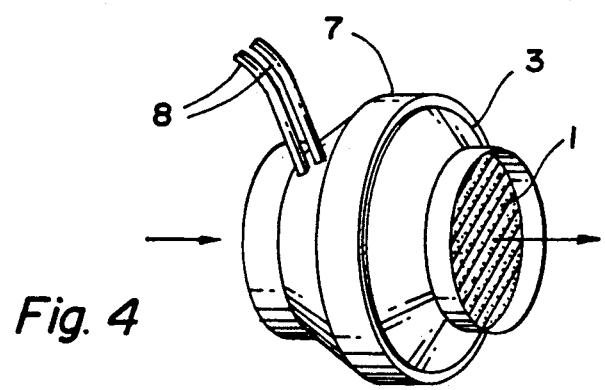
FIG. 4 is a perspective view of a second embodiment of the pleated flat filter apparatus.

What follows is a detailed description of the invention illustrated in the drawings and the construction of the main individual elements of this new invention. The pleated flat filter of the present invention is constructed to remove pollutants emitted from the exhaust fumes of the motor vehicles and also from the air existing in the motor vehicles, such as hydrocarbons, odors, soot, smoke, dust and allergens-pollen, for the benefit of the occupants of the motor vehicle.

Refering to FIGS. 1 and 2 a container 1-A can houses one or more different media, the final layer uses hard finish pleated media 4 on outlet side for cleaning the air from particles, the inlet side uses pleated media 5 with activated charcoal carbon powder for absorbing hydrocarbons and odors from the polluted air, and for extending the life of the filter and keeps lowers the resistance we can use third layer of the media 6 which prevents large particles from entering the filter. Layer 6 includes screen 3-A. As can be seen in FIGS. 1 and 2, the pleated layers 4 (without activated carbon) and 5 (with activated carbon) are disposed in a stacked relationship, or, in other words, they are co-pleated so that they occupy relatively little space. A container of housing of the pleated flat filter apparatus includes two parts: 3 and 7 which house a filter element 1 for cleaning the air of pollution. The container part 3 houses a replaceable filter 1 and sensor switch 2 which notifies the driver whenever the filter element 1 becomes dirty. The container part 7 houses tubing which defines a hot water heater 8 for protecting the filter element 1 from freezing and keeps the filter element 1 dry and also stops bacteria from multiplying and prevents odors.

In system A, as shown in FIG. 3, the apparatus includes the flat pleated filter element 1 installed in fresh air inlet 13 and which is connected to the cowl plenum chamber 12. Also, in system A there is installed a filter element 1, in inlet 15 which is provided for re-circulating the air within the vehicle. A frame 17 holds the filter element 1. A valve means or mechanism 16 for regulation opens a door 14 for circulation of air. System A cleans the air which a blower 18 pulls from outside the vehicle, and existing air from inside the vehicle.

FIG. 3-A shows system B which uses a hot fluid/water heater in fresh air inlet 13 and only one pleated filter element 1 is installed in the cowl plenum chamber between the evaporator 19 and a heater core 20, and also uses a valve 16. Similar to the valve 16 in this system only one filter element 1 cleans the air which the blower 18 pulls from outside the vehicle, and existing air from inside the vehicle.

Figure 5:
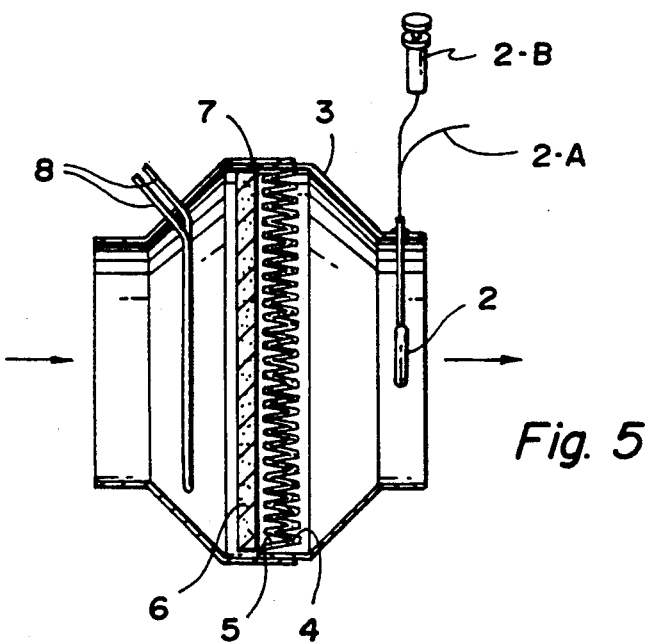
FIG. 5 is a side view, partially broken away, of the filter apparatus of FIG. 4.
Figure 6:
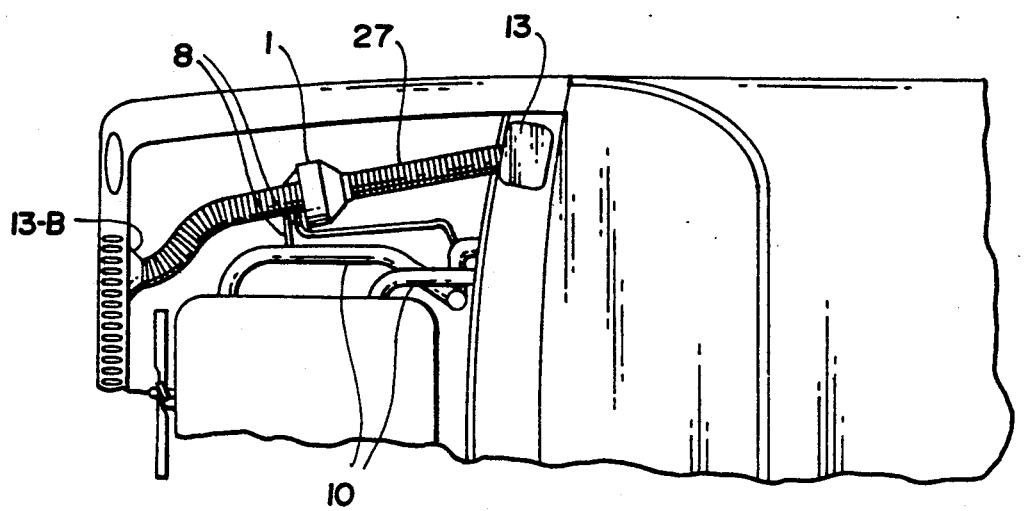
FIG. 6 is a sectional view of the filter apparatus of FIG. 4 installed in a vehicle.

FIGS. 4 through 6, shows the filter apparatus includes the filter element 1 installed in a housing 3 and 7 which is connected by defrosting housing 27 to fresh air inlet 13 and which is connected to the cowl plenum chamber 12. A housing part 7 support a fresh air inlet 13-B and a hot fluid/water heater 8. A housing part 3 housing filter element 1 which is connected to fresh air inlet 23. A fresh air inlet 13 has an appropriate amount of square inches area to allow sufficient air to the interior vehicle. Also blower 18 is appropriate constructed to produce enough force to pull or push a sufficient amount of air through the filter element 1.

Refering now to FIGS. 3 and 3-A, a cowl plenum chamber 12 contains the necessary instruments that pull air from the exterior, clean it, cool or heat it, and conduct it to the appropriate outlets. The blower 18 pulls air in with appropriate force from the outside and forces it into the interior. The door 14 is provided which allows the air from the outside to inter the vehicle from inlet 13, 13-A or 13-B through inlet 15 for the re-circulating air. An evaporator 19 cools the air. A heater core 20 heats the air. An air mix door 21 is provided by means of which we regulate the heating or cooling of the air, doors 22, 23 are provided by means of which we regulate the flow of the air to the defroster vents 24, front vents 25 and floor vents 26.

In each of the embodiments, electric power is connected via a conductive wire 2-A to the sensor switch 2 via a conductive wire 2-A to the warning light 2-B on instrument panel of the vehicle. Also electric power is connected via a conductive wire 29 to the fog button 28 an instrument panel of the vehicle and via a conductive wires 30 and 31 to the heater and to the conditioner.

Refering to FIGS. 3, 3-A and 6, a vent 13-A and 13-B pulls into the vehicle by means of air resistance, which makes it easier to obtain sufficient air. A hot water heater 8 is connected to hoses 10 between the heater core 20 and a heater control valve 11 which provides hot water to the heater core 20. If cool air is used, the valve 11 prevents the flow of hot water between the heater core 20 and the heater 8. In this way the hot water heater is connected to the heating cooling system of the motor vehicle. A heater control valve 9 is used in the absence of a heater control valve 11.

It is clear from the FIGS. 1,2,3,4 and 5 that the pleated filtering layers are disposed virtually perpendicular to the general direction of flow of air, or any fluid, through the filter. The direction of flow is straight due to the inlet and outlet of the filter being disposed opposite each other.

Refering to FIGS. 1 and 2, a final layer 4 is at the appropriate quality water-resistant fibers, such as 4 oz. Spunbended 100% Polyester Reemay pleated by Pleatco of West Babylon, N.Y. On inlet side layer media 5 is at the appropriate quality water-resistance fiber, such as Polysorb TM activated charcoal powder carbon made by Columbus Industries, In. of Ashville, Ohio. Also is made by Lewcott Corporation of Millbury, Mass. The layer media 6 is at the appropriate quality water-resistant fibers, such as VL-10St, or VL-07 or VL-90, made by Moldan Corporation, of Pineville NC.

While the best mode for carrying out the invention has been described in detail those familiar with the art to which this invention relates will recognize various alternative designs and embodiments for practicing the invention as defined by the following claims.

What is claimed is:

1. An air purification filter for passenger compartment of a motor vehicle, said filter comprising
   a housing having an inlet and an outlet disposed opposite each other to define an essentially straight direction of fluid flow therebetween,
   a first flat pleated layer of filtering material with a sufficient amount of activated carbon to remove at least partly pollutants from air passing through the filter,
   a second flat pleated layer of a particulate filtering material in stacked relationship with said first flat pleated layer,
   a heater located upstream of said filtering layers for raising the temperature of air entering said filtering layers,
   wherein said first pleated flat layer and said second pleated flat layer are disposed essentially perpendicularly to the direction of fluid flow between the inlet and the outlet.

2. A filter according to claim 1 wherein said pleated layer of particulate-filtering material is disposed between said activated-carbon containing layer and the outlet of the filter.

3. A filter according to claim 1, further comprising a pre-filtering layer between the inlet of the filter and said activated-carbon containing layer.

4. A filter according to claim 1, further comprising a sensor responsive to the degree of contamination of said filter.

5. A filter according to claim 1, disposed downstream of an air conditioner of the motor vehicle.

* * * * *

UNITED STATES PATENT AND TRADEMARK OFFICE
CERTIFICATE OF CORRECTION

PATENT NO. : 5,192,346
DATED : March 9, 1993
INVENTOR(S) : Thaddeus Kowalczyk It is certified that error appears in the above-identified patent and that said Letters Patent is hereby corrected as shown below:

IN THE DRAWINGS:

Sheet 2 of 3, should be deleted to appear as per attached sheet 2 of 3.

Signed and Sealed this

Third Day of May, 1994

Attest:

BRUCE LEHMAN

Attesting Officer   Commissioner of Patents and Trademarks

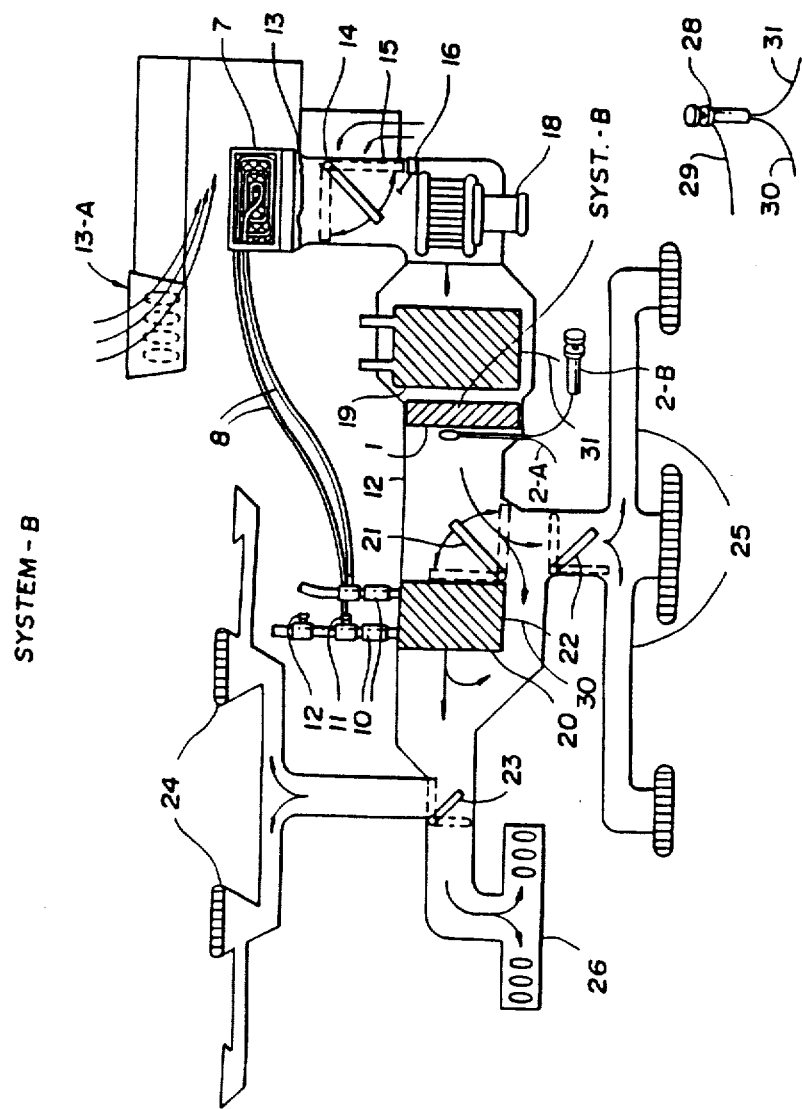
Fig. 3-A